(12) United States Patent
Schlipf et al.

(10) Patent No.: US 10,124,881 B2
(45) Date of Patent: Nov. 13, 2018

(54) SYSTEMS AND METHODS FOR LOAD INTRODUCTION ELEMENT FOR A MOVABLE SURFACE OF AN AIRCRAFT

(71) Applicant: Airbus Operations GmbH, Hamburg (DE)

(72) Inventors: Bernhard Schlipf, Bremen (DE); Tayson William Weiss, Goettingen (DE)

(73) Assignee: Airbus Operations GmbH, Hamburg (DE)

(*) Notice: Subject to any disclaimer, the term of this patent is extended or adjusted under 35 U.S.C. 154(b) by 596 days.

(21) Appl. No.: 14/019,934

(22) Filed: Sep. 6, 2013

(65) Prior Publication Data
US 2014/0059826 A1 Mar. 6, 2014

Related U.S. Application Data

(63) Continuation of application No. PCT/EP2012/055012, filed on Mar. 21, 2012.
(Continued)

(30) Foreign Application Priority Data

Mar. 22, 2011 (DE) .................. 10 2011 014 687

(51) Int. Cl.
*B64C 9/22* (2006.01)
*B64C 1/14* (2006.01)

(52) U.S. Cl.
CPC .................. *B64C 9/22* (2013.01); *B64C 1/14* (2013.01); *Y02T 50/44* (2013.01); *Y10T 29/49815* (2015.01)

(58) Field of Classification Search
CPC .... B64C 9/22; B64C 9/06; B64C 1/14; B64C 1/1446; Y10T 29/49815
See application file for complete search history.

(56) References Cited

U.S. PATENT DOCUMENTS 1,472,199 A * 10/1923 Thomson .................. B64C 9/22
244/210
1,818,000 A 8/1931 Moles
(Continued)

FOREIGN PATENT DOCUMENTS

CN 101115655 A 1/2008
CN 101466597 A 6/2009
(Continued)

OTHER PUBLICATIONS

Niu, Michael C., Airframe Structural Design, CONMILITPRESS Ltd., 8th Printing (1995).
(Continued)

*Primary Examiner* — Jessica B Wong
(74) *Attorney, Agent, or Firm* — Lorenz & Kopf LLP

(57) ABSTRACT

A load introduction element for a movable surface of an aircraft comprises a load introduction body that is connectable with the surface. A fitting connected with the load introduction body with a first section and a second section. The first section comprises a first bearing means, the second section comprises a second bearing means, and the first or second section comprises a third bearing means. The fitting is pivotally connected with the load introduction body by way of the first bearing means. An adjustment unit connects the second bearing means with the load introduction body in a variable position and is positioned on a side of the load introduction body that is opposite the fitting. In this manner adjustment of a reference position of a surface takes place without the need for an access flap. By loosening the adjustment unit the movable surface is pivotable without moving a flap drive.

11 Claims, 6 Drawing Sheets

Related U.S. Application Data

(60) Provisional application No. 61/466,322, filed on Mar. 22, 2011.

(56) References Cited

U.S. PATENT DOCUMENTS

| | | | |
|---|---|---|---|
| 3,363,859 A | 1/1968 | Watts | |
| 4,262,868 A * | 4/1981 | Dean | B64C 9/22 244/214 |
| 4,964,594 A * | 10/1990 | Webb | B64C 1/12 244/129.3 |
| 5,158,252 A | 10/1992 | Sakurai | |
| 7,264,206 B2 | 9/2007 | Wheaton et al. | |
| 2009/0121079 A1 * | 5/2009 | Stark | B64C 1/06 244/118.1 |
| 2014/0059826 A1 | 3/2014 | Schlipf et al. | |

FOREIGN PATENT DOCUMENTS

| | | |
|---|---|---|
| EP | 1338506 A1 | 8/2003 |
| WO | 2010103157 A4 | 11/2010 |
| WO | 2011020593 A2 | 2/2011 |

OTHER PUBLICATIONS

International Searching Authority, International Search Report for PCT/EP2012/055012 dated Jul. 2, 2012.
State Intellectual Property Office of the Peoples' Republic of China, Office Action for Chinese Patent Application No. 2012800144149 dated Dec. 22, 2014.
European Patent Office, Intent to Grant for European Patent Application No. 12710082.4 dated Feb. 12, 2015.

* cited by examiner

PRIOR ART

SYSTEMS AND METHODS FOR LOAD INTRODUCTION ELEMENT FOR A MOVABLE SURFACE OF AN AIRCRAFT

CROSS-REFERENCE TO RELATED APPLICATIONS

This is a continuation of International Application No. PCT/EP2012/055012, filed Mar. 21, 2012, which application claims priority to German Application No. 10 2011 014 687.3, filed Mar. 22, 2011, and to U.S. Provisional Patent Application No. 61/466,322, filed Mar. 22, 2011, which are each incorporated herein by reference in their entirety.

TECHNICAL FIELD

The technical field relates to a load introduction element for a movable surface of an aircraft, to an aircraft with at least one movable surface and at least one load introduction element, and to a method for loosening a movable surface connected with a load introduction element.

BACKGROUND

Aerodynamically effective slats and flaps or other movable surfaces on aircraft are usually positioned on a wing or on tail units and are driven by drive units. Apart from simple flaps that are only pivotable on one pivot axis there are also surfaces that implement more complex motion sequences, for example wing leading-edge flaps of a high-lift system. To implement the specified motion sequence, motion kinematics are used that are implemented by way of curved toothed racks or multi-articulated chains in order to carry out both translational and rotational motions. In order to carry out necessary inspection and maintenance tasks on a leading edge interior of an aircraft wing, in the state of the art a leading-edge flap is usually fully extended. In the case of a flap drive system that is blocked at standstill, for this purpose the connection between a leading-edge flap body and the drive unit must be disconnected, and external actuation must be used. However, in the retracted flap position the mechanical connection between the leading-edge flap body and the drive unit, which connection is to be separated, is also positioned within the leading edge interior and in the state of the art is achieved by access flaps provided for this purpose. These access flaps may have a disadvantageous effect on the structural-mechanical characteristics (strength, damage tolerance, weight) and on the production expenditure relating to the flap system.

Furthermore, as a result of production and installation, deviations from the intended position of a leading-edge flap relative to a main wing may occur, and thus an undesirable change in the aerodynamic performance parameters may result. In order to achieve an aerodynamically favorable flap position, the alignment of a flap system relative to the main wing is designed so as to be adjustable. In the state of the art, adjustment of the flap position usually takes place with the use of eccentric bearings and longitudinally adjustable gear rods. Adjustment of these elements is not possible in the retracted flap position.

Other objects, desirable features and characteristics will become apparent from the subsequent summary and detailed description, and the appended claims, taken in conjunction with the accompanying drawings and this background.

SUMMARY

According to various embodiments, provided is a device that reduces or entirely eliminates the above-mentioned disadvantages. In particular, the various teachings of the present disclosure provide a load introduction element by means of which a connection between a movable surface and a drive unit and kinematic gear elements can be created, while at the same time a position of the surface in a reference position can be set as easily as possible, wherein for this purpose neither motion of the drive unit nor a maintenance or access flap should be necessary.

In one exemplary embodiment, the load introduction element comprises a load introduction body that is connectable with the movable surface and that generally comprises a shape that corresponds to a structure of the surface to be connected. Movable surfaces, for example high-lift flaps on wing leading edges on aircraft, frequently comprise ribs that are connected with spars and that are enclosed by an outer skin. In principle, a load introduction body can have the shape of an adjacent rib and is connectable so as to be flush with a rib of the movable surface so that a smooth continuous transition from the movable surface to the load introduction element can be provided. The loads generated by the movable surface in the airflow are transferred by way of the load introduction body to a kinematic path guidance device and to a drive unit.

The load introduction element according to various embodiments further comprises a fitting that is connectable to the load introduction body. A first section of the fitting comprises a first bearing means, for example an eye or a spherical joint, that is connectable to a first bearing point of the load introduction body and makes it possible to implement a pivotally mounted arrangement of the fitting on the first bearing point. Furthermore, the fitting comprises a second bearing means that is arranged on a second section of the fitting and opposite the first bearing means. The second bearing means is connectable with a second bearing point of the load introduction body and allows firm coupling between the fitting and the load introduction body. A third bearing means arranged on the fitting is used to receive a drive element of a drive unit to cause motion of the load introduction body and thus of the movable surface.

In order to be able to adjust the geometric position of the fitting and of the load introduction body, between the second bearing point of the load introduction body and the second bearing means of the fitting an adjustment unit is arranged that is designed to fix the second bearing means of the fitting firmly to the load introduction body in a variable position. Since the first bearing means of the fitting and the first bearing point of the load introduction body are always connected with each other, by selecting the position of the second bearing point an angular position of the fitting relative to the load introduction body can be varied. According to the various teachings of the present disclosure, the adjustment unit extends to a side of the load introduction body, which side is opposite the fitting so that the position of the fitting, which in the retracted surface position is usually located in the interior of an aircraft structure, can be varied relative to the load introduction body from a side of the load introduction element, which side in a reference position is situated outside the aircraft structure.

One of various aspects of the present disclosure thus comprises a clearly more advantageous arrangement, when compared to the state of the art, of a total of three bearing means on a fitting connected with a load introduction body. Positioning the surface connected with the load introduction element takes place by pivoting the fitting to the load introduction body by means of the adjustment unit. The adjustment unit is not designed as a length-adjustable coupling element as is usual in the state of the art, which coupling element requires the movable surface to pivot out for its adjustment. According to various embodiments, with the surface retracted, the reference angle of the fitting and as a result of this also the reference angle of the movable surface can be adjusted from a position that is accessible from the outside. For this reason it is not necessary to arrange an access or maintenance flap that is otherwise necessary to adjust the position of the movable surface, and consequently a not insignificant part of the weight can be saved. The term "movable surface" predominantly refers to movable elements that comprise an aerodynamically effective surface and that can be moved to provide their function. These elements can include control surfaces such as ailerons, rudders or elevators, or flaps such as spoilers, high-lift flaps on a leading edge, or on a trailing edge of a wing or any other related kind of bodies.

In one exemplary embodiment, the adjustment unit comprises a first connecting means, which is pivotally mounted in the fitting, and a second connecting means, that is designed so as to correspond to the first connecting means, which is insertable from a side of the load introduction body, which side is opposite the fitting, so as to extend into the first connecting means. The connecting means can, for example, be implemented in the form of a first and a second screwing device. By inserting the first screwing device a connection arises between the load introduction body and the fitting, wherein due to the pivotable bearing arrangement of the first connecting means directional adaptation of the first connection means results, which adaptation is necessary for screwing in and which adaptation depends on the angle between the fitting and the load introduction body, and changes with the placement depth, for example the screwing-in depth, of the second connecting means. The first connecting means could be designed as a first screwing device and in the simplest case as a barrel nut that comprises an internal thread with a first longitudinal axis, wherein the barrel nut is held so as to be pivotable on an axis that is aligned so as to be perpendicular to its first longitudinal axis. The second connecting means could be designed as a second screwing device and in the simplest-possible form as a stud or a screw with a second longitudinal axis, which stud or screw is inserted in a correspondingly arranged hole that comprises a recess or a depression in the load introduction body, extends through the load introduction body, and can be screwed into the barrel nut. The second longitudinal axis and the first longitudinal axis then automatically correspond as a result of the pivotally mounted arrangement of the first screwing device.

In one embodiment of the present disclosure, the fitting comprises a first supporting surface that is arranged on a side of the fitting, which side faces the load introduction body. On a side facing the fitting the load introduction body comprises a variable-position end stop for resting against the first supporting surface. In this manner a one-sided delimitation of a pivot motion of the fitting over the first point of articulation is carried out. If, for example, a couple of screwing devices for establishing a connection between the load introduction body and the fitting are used, simple delimitation of the position of the fitting relative to the load introduction body can be achieved by tensioning the fitting against the variable-position end stop. In this case the mechanical design is very robust and reliable, because, as a result of the corresponding design of the end stop and of the adjustment unit, practically any forces can be absorbed.

With the use of a first screwing device and of a second screwing device as a first and a second connecting means for connecting the load introduction body and the fitting, by loosening at least one of the screwing devices, pivotability of the fitting and of the load introduction body can be achieved without the need to move or loosen a drive element connected with the third point of articulation. In particular in the design of the path guidance kinematics for wing leading-edge flaps, accessibility of the interior of the wing leading edge for maintenance purposes is provided even without extending movable surfaces.

In one exemplary embodiment of the present disclosure, the fitting on the third bearing means comprises a spherical bearing or a pivoting bearing. Introducing a force through a drive element can thus also take place obliquely to the fitting and, furthermore, mobility of the movable surface with the adjustment unit loosened is improved.

In one embodiment, the load introduction body is designed as a load introduction rib for a wing leading-edge flap, wherein on the first point of articulation on a nose-side region of the load introduction rib a third connecting means forms a pivotally mounted arrangement between the fitting and the load introduction body. This third connecting means can be designed as a screwing device in the form of a stud that can be screwed into a threaded hole.

In one exemplary embodiment of the present disclosure, the load introduction body comprises a holding element that extends to the fitting, wherein the fitting is connected with the holding element by way of the first bearing means. The holding element thus provides a first point of articulation. Consequently, the fitting, which is connected with the first point of articulation, can be shortened in a first section so that consequently less flexural stress needs to be taken up. The holding element can be implemented as a clamp or a clamp-like body that by way of an attachment surface is attached to a structure of the load introduction body and that comprises an overhang, a lever arm, a flange or similar characteristics that make it possible to pivotally connect a fitting.

With the use of such a holding element, in one of various embodiments of the present disclosure, the first bearing means of the fitting is arranged outside the profile of the load introduction body. In this arrangement the profile of the load introduction body comprises the region of the load introduction body that is enclosed or enveloped by an outer surface, wherein this outer surface generally corresponds to the surface attached to the load introduction body. This means that the holding means generally extends over an outer surface of the movable surface. As a result of this shape of the holding element, accessibility for loosening the first bearing means is additionally improved, and the expenditure for loosening the surface is clearly reduced.

The present disclosure also provides an aircraft with at least one movable surface that is connected with at least one drive unit by way of at least one load introduction element.

According to various aspects, a method for loosening a movable surface connected with such a load introduction element is also provided, in which method the loosening of the connection between the fitting and the load introduction body on the first bearing means is carried out.

A person skilled in the art can gather other characteristics and advantages of the disclosure from the following description of exemplary embodiments that refers to the attached drawings, wherein the described exemplary embodiments should not be interpreted in a restrictive sense.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Figure 1A:
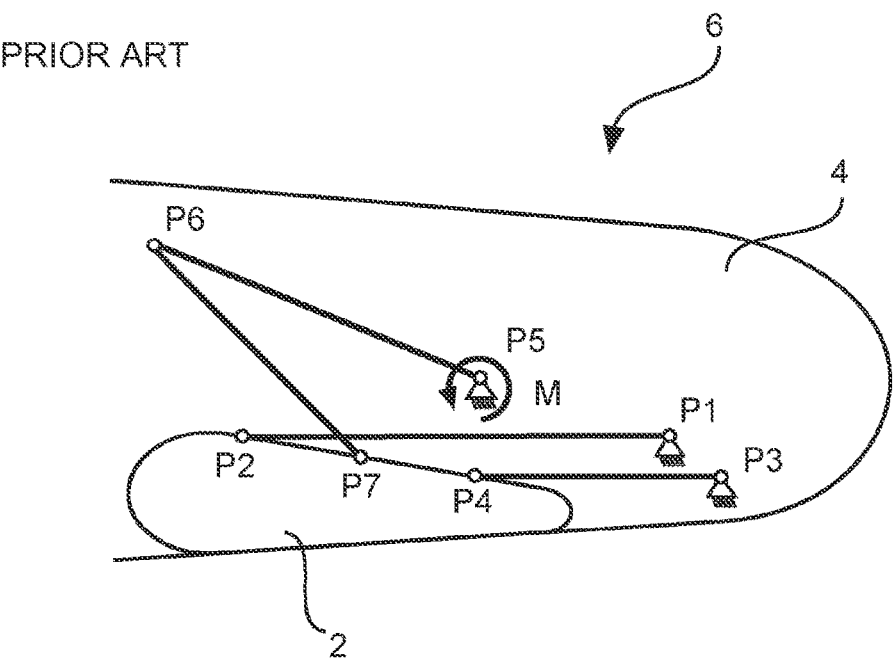
FIGS. 1A and 1B diagrammatically show the kinematic path guidance device of movable surfaces, designed as Krueger-type leading edge flaps, according to various embodiments of the present disclosure.
Figure 1B:
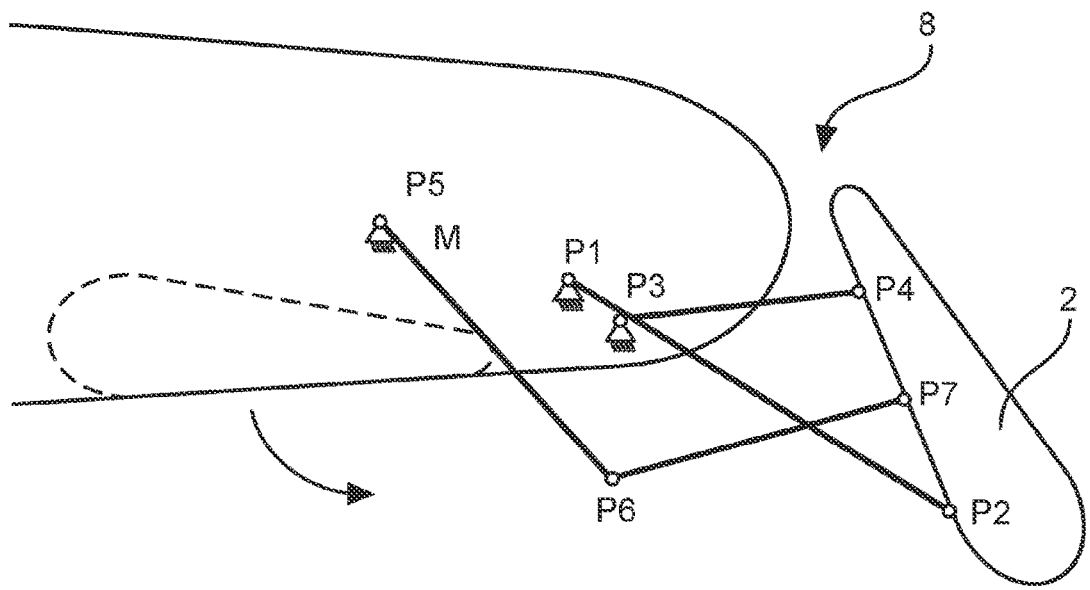

FIGS. 1A and 1B show a movable surface 2 of an aircraft, which movable surface is designed as a high-lift flap in the form of a Krueger-type leading edge flap. This type of flap can usually be moved from a stowed position shown in FIG. 1A where the flap is located flush in a wing 4 to an activation position shown in FIG. 1B, in order to increase the aerodynamically effective surface and curvature of the wing 4. In addition, airflow separation or stall at the top of the wing 4 is delayed in that energy-rich airflow is fed to the top of the wing 4 through a gap 8 between the leading edge of the wing 4 and the surface 2. The necessary motion path of the surface 2 is therefore comparatively complex and is generally implemented by way of a four-joint chain that is characterized by the points of articulation P1, P2, P3 and P4 shown in FIGS. 1A and 1B. In this arrangement the points of articulation P1 and P3 are on or in the wing 4, while the points of articulation P2 and P4 are arranged on the surface 2. Between the points of articulation P1 and P2 and between P3 and P4 there are rigid gear elements whose lengths together with the positions of the points of articulation P1, P2, P3 and P4 form design parameters for the motion path. Carrying out a pivoting motion on the motion path requires a drive moment M which is, for example, provided by a drive unit in a fifth point of articulation P5 and is transmitted to the surface 2 by way of a three joint chain with the points of articulation P5, P6 and P7.

The position of the surface 2 in the stowed position, as shown in FIG. 1A, depends on the real construction, subject to tolerance, of the above-mentioned gear elements and on the positions of the points of articulation P2 and P4; in the state of the art said position can be adjusted by adjusting the lengths of the associated gear elements, for which purpose it is, however, necessary to ensure access to the gear elements by way of access flaps or the like, while at least partial extension of the surface 2 needs to take place. Access flaps have a disadvantageous effect on the structural-mechanical characteristics (strength, damage tolerance, weight) and on the production expenditure relating to the surface 2.

Figure 2A:
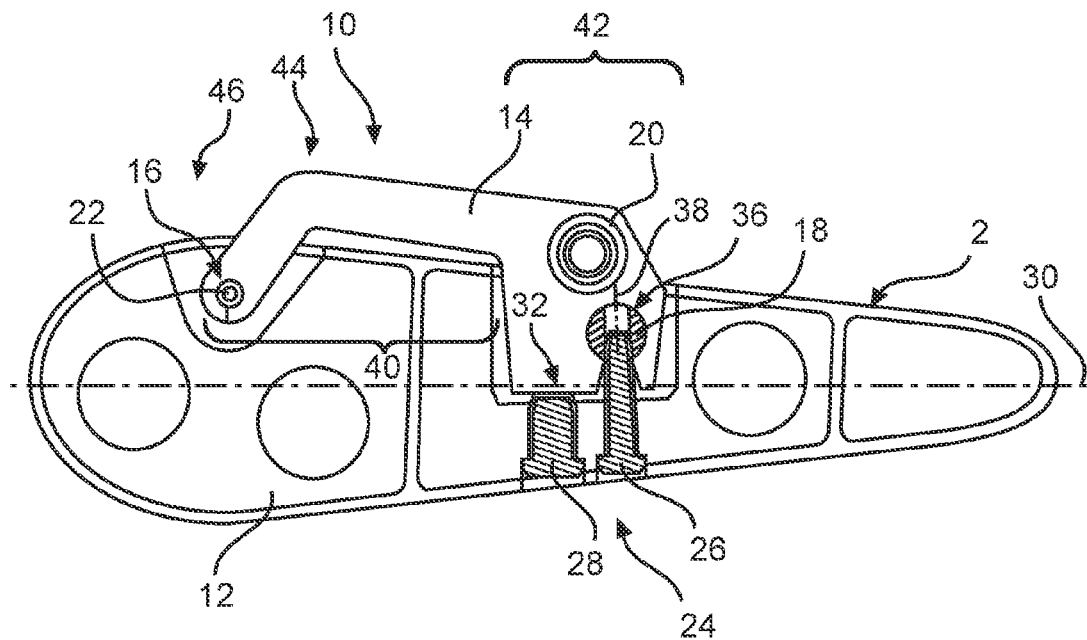
FIGS. 2A and 2B show section views of a load introduction element according to various embodiments with two different relative positions of a load introduction body.

FIG. 2A shows a load introduction element 10 according to various embodiments with a load introduction body 12 designed as a load introduction rib, a fitting 14 with a first bearing means 16, a second bearing means 18 and a third bearing means 20, wherein the first bearing means 16 is designed as an eye through which a first securing means 22 can be inserted into a corresponding first bearing point of the load introduction body 12. Said first securing means 22 could be designed as a screwing device in the form of a stud that is secured by means of a locknut. The first bearing means 16 thus makes it possible for the fitting 14 to pivot on an axis of the first bearing means 16 or on the first bearing point of the load introduction body 12.

On the load introduction body 12 the surface 2 to be moved is attached by way of a sheet-like or point-like connection, wherein for this purpose, for example, overlaps (not shown) between the load introduction body 12 and the movable surface 2 could be provided. The loosenable fitting 14, whose relative position to the load introduction body 12 can be adjusted, is designed to transmit loads between a drive element, path guidance kinematics, the load introduction body 12 and thus the surface 2.

In order to compensate for the tolerances during installation of the load introduction element 10 according to the various teachings of the present disclosure, in particular the angle between a profile chord 30 of the load introduction body 12 and a selectable reference axis that is fixed in the aircraft is to be adjusted. Since the position of the load introduction body 12 and thus of the surface 2 depends on the position of the third bearing means 20 on the load introduction body 12, adaptation can be achieved by adjusting the adjustment unit 24. To this effect the length or the screwing-in depth of the second screwing device 26 is varied and is secured by a corresponding setting of the adjustable end stop 28 so that in a suitable position a supporting surface 32 of the fitting 14 can rest against a delimitation surface 34 of the end stop 28. The end stop 28 itself can also be designed as a screwing device, which is screwed into the load introduction body 12 in order to, subsequently, by means of the second screwing device 26 pull the second bearing means 18 to the supporting surface 34 and in that position cause bracing.

The second bearing means 18 can be designed in the form of a barrel nut that is pivotally held in a correspondingly formed seat 36 of the fitting 14 and comprises a rotary axis which extends substantially vertically to the center axis 38.

Furthermore, the fitting 14 comprises a first section 40 that extends from a region near the third bearing means 20 or near the supporting surface 32 to the first bearing means 16, wherein the first bearing means 16 is significantly further removed from the third bearing means 20 than is the second bearing means 18. For this reason the profile width of the first section 40 is narrower than the profile width of the remaining part of the fitting 14, which part is hereinafter referred to as the second section 42.

Figure 2B:
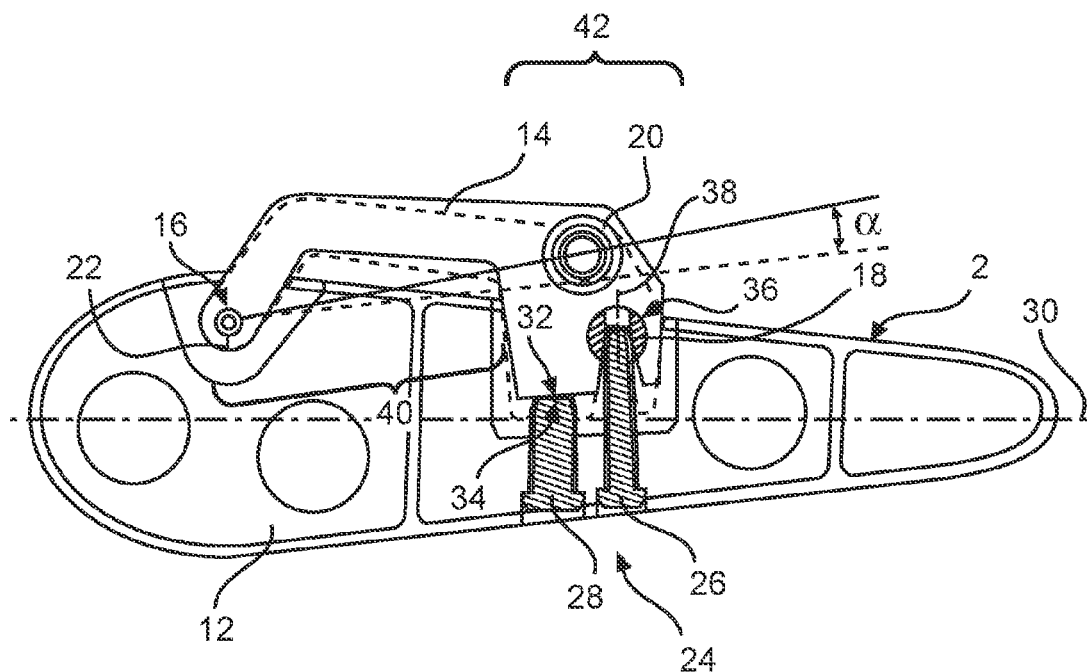

The first section 40 of the fitting 14 comprises a kink 44 because the first bearing means 16 is situated within the profile cross section of the load introduction body 12. The first section 40 of the fitting 14 extends from the profile cross section of the load introduction body 12 towards the outside before extending to the greatest extent possible so as to be parallel to a delimitation surface 46 of the load introduction body 12 to the third bearing means 20. FIG. 2B shows the effect of a changed screw-in depth of the second screwing device 26 in the form of an altered position angle α. If a longer second screwing device 26 is used, the second bearing means 18 is displaced in such a manner that the third bearing means 20 moves further from the profile of the load introduction body 12 or away from it, so that resulting from a determined fixed position of a drive element (not shown) the load introduction body 12 is displaced from the drive element by the angle α. If a shorter screwing device 26 is used, or if a larger screw-in depth is used, the load introduction body 12 is pulled further towards the fitting 14 and thus towards the drive element.

Figure 3:
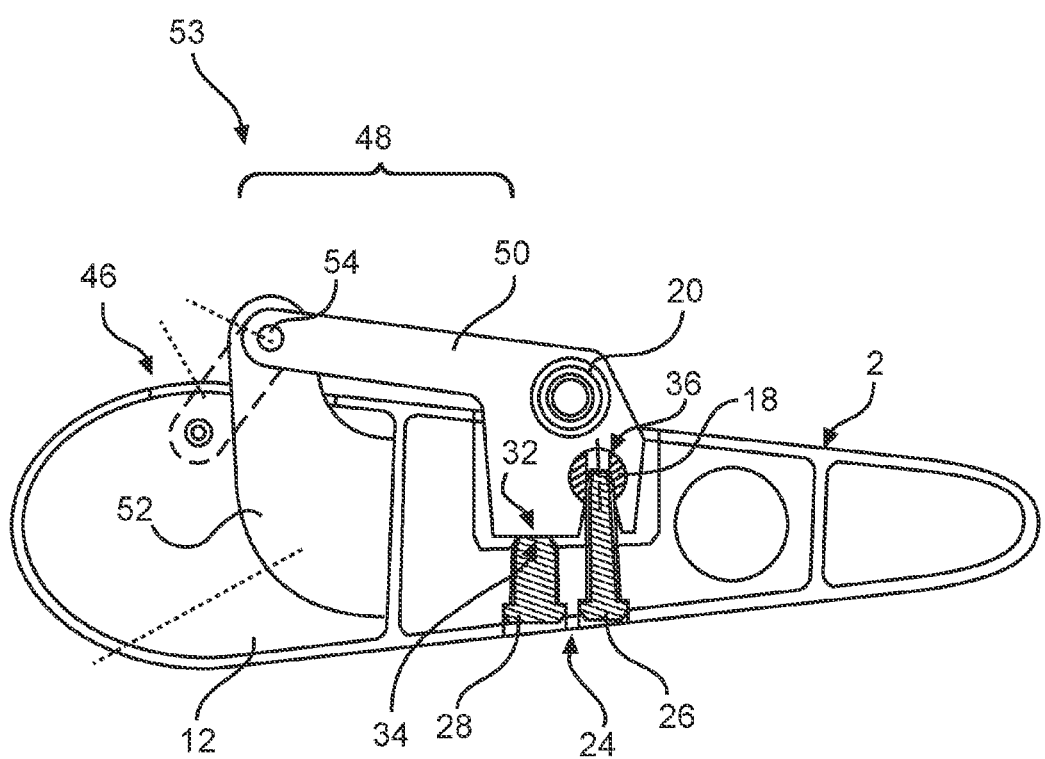
FIG. 3 shows a section view of a modified load introduction element according to various embodiments.

An alternative view is shown in FIG. 3 in which a first section 48 of a modified fitting 50 extends to the greatest extent possible only parallel to a delimitation surface 46 of the load introduction body 12 towards the third bearing means 20. To this effect a holding element 52 is arranged on the load introduction body 12, which holding element 52 extends from the profile of the load introduction body 12 towards the outside where it provides an alternative first bearing means 54. This results in lesser load exposure of the fitting 50 in a region around the third bearing means 20, which due to a lower bending moment results from the shorter distance between the first point of articulation 54 and the third bearing means 20. In addition an access gap to the interior of the load introduction body 12 is enlarged, and access to the first bearing means 16 is improved.

Figure 4A:
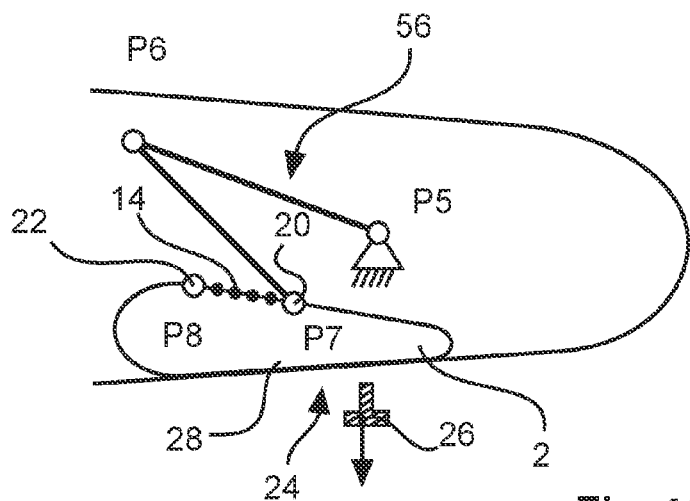
FIGS. 4A, 4B and 4C show a diagrammatic view of the motion of a movable surface with the adjustment unit of the load introduction element according to various embodiments loosened.
Figure 4B:
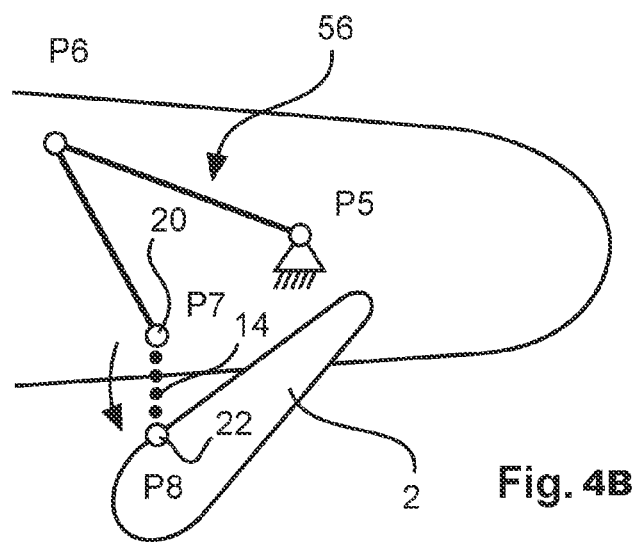
Figure 4C:
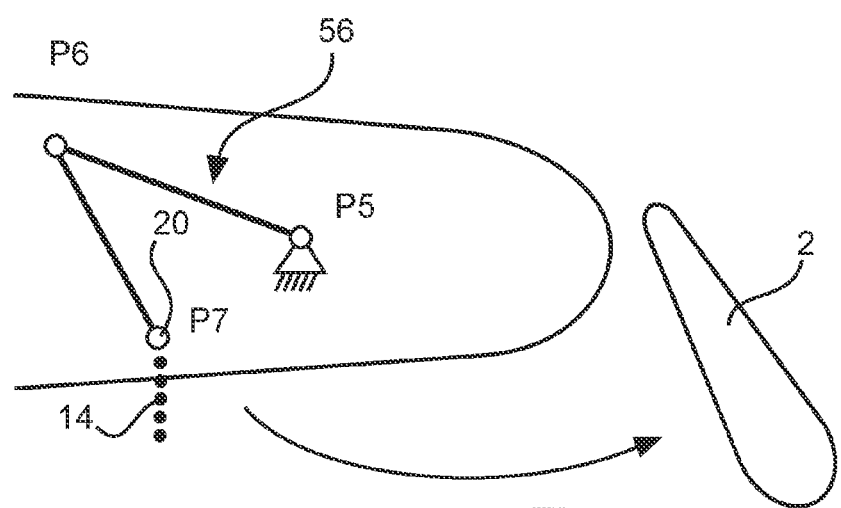

FIGS. 4A, 4B and 4C diagrammatically show the measures that are implemented to loosen the surface 2, without moving a drive element, with the use of a load introduction element according to various embodiments, which is particularly sensible for maintenance work on or in an interior of a wing leading edge. In a first step the adjustment unit 24 is loosened in that, for example, the second screwing device 26 is removed. The load introduction body 12 can consequently be extended by a limited distance of the path determined by the kinematics. In this process, rotation of the load introduction body 12 on the bearing means 16 or 54 takes place. Delimitation of the extension motion depends on the concrete design of a drive element 56 coupled to the third bearing means 20. At the same time the distance between a point of articulation, in FIGS. 4A-4C diagrammatically designated P6, of the drive element 56 and the point designated P8, which point coincides with the securing means 22 or with the first bearing means 16 or 54, is increased as a result of this.

FIG. 4B shows the possible end position of the extension motion of the surface 2, which extension motion is limited as a result of the connection, by way of the third bearing means 20, with the drive element 54. By loosening the drive element 56 from the third bearing means 20 of the fitting 14 the extension motion of the surface 2 can be carried out completely. In a position shown in FIG. 4C the surface 2 provides adequate access to the interior of the wing 4.

Figure 5:
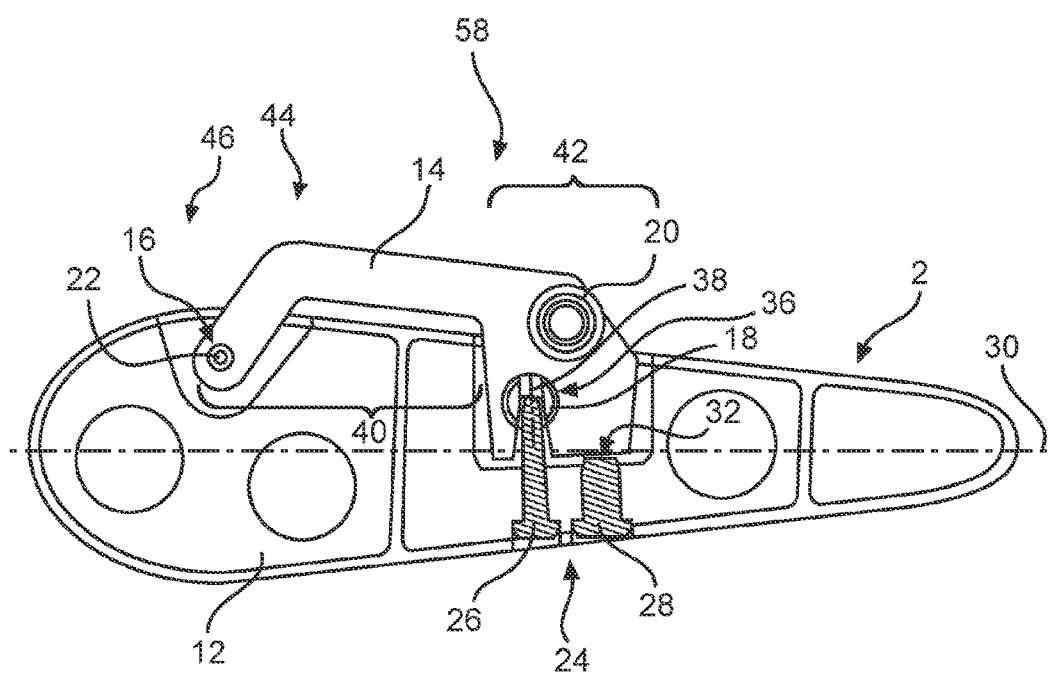
FIG. 5 shows a modification of a load introduction element with a modified adjustment unit.

FIG. 5 provides a load introduction element 58 which essentially corresponds to the load introduction element 10 of FIG. 2. However, in this variant the positions of the adjustable end stop 28 and of the second screwing device 26 are the other way round in order to cause different tension in a region around a third bearing means 20 of the fitting. The question as to which of the two variants may be desirable depends on the respective design and implementation of the fitting 14.

Figure 6:
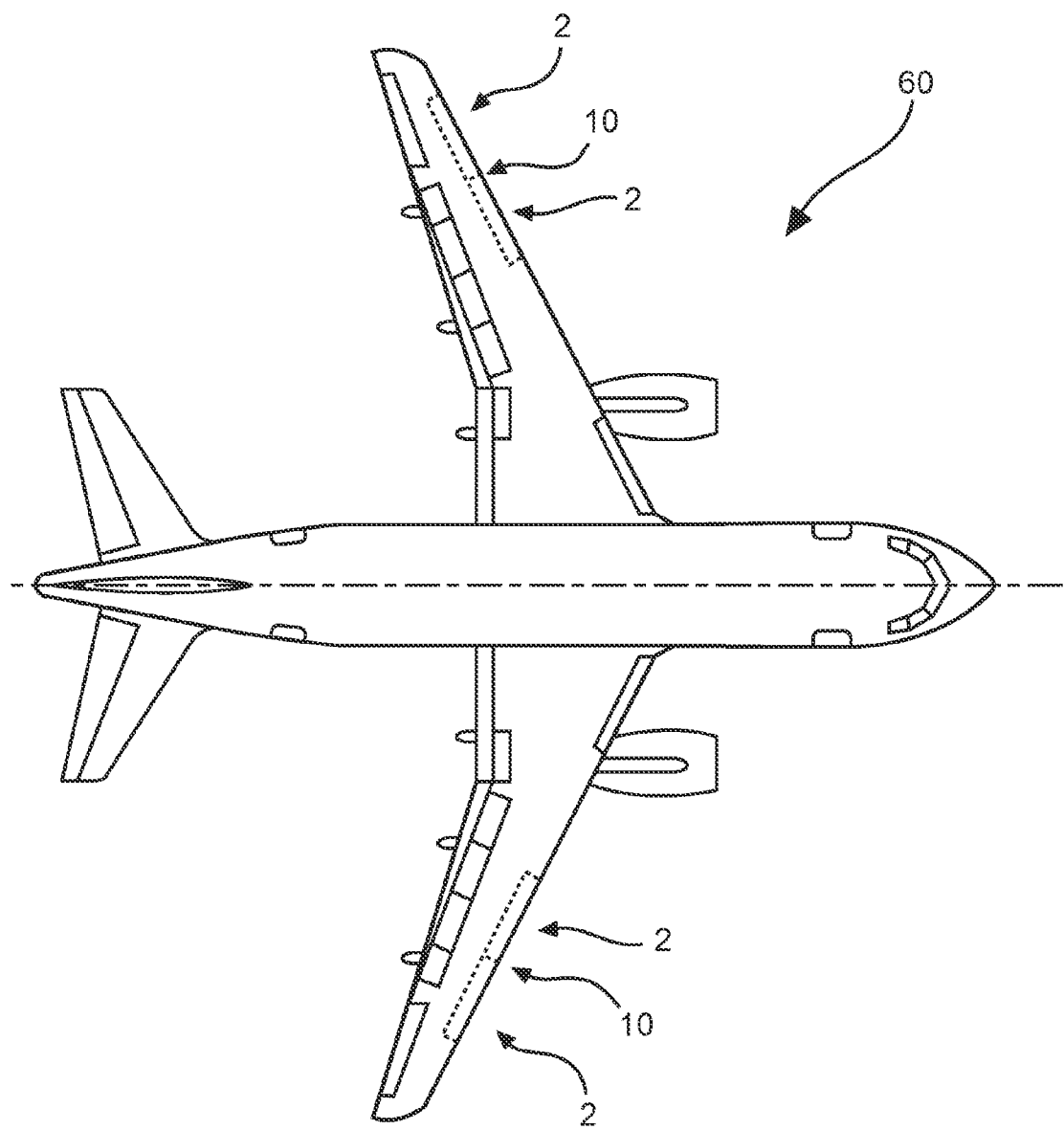
FIG. 6 shows an aircraft with a flap system with a number of movable surfaces that are connected with load introduction elements according to various embodiments.

Finally, FIG. 6 shows an aircraft 60 that comprises a number of movable surfaces 2 in the form of high-lift flaps implemented as Krueger-type leading edge flaps, which are connected with a load introduction element 10, 58 according to the various teachings of the present disclosure. The aircraft 60 can support simplified adjustability of the reference positions of the surfaces 2 and at the same time save the access flaps commonly used in the state of the art so that the aircraft 60 provides weight advantages when compared to known aircraft.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

What is claimed is:

1. An aircraft comprising:
a moveable control surface component having a top outer surface and a bottom outer surface; and
a drive unit configured to move the moveable control surface component;
the moveable control surface component further comprising:
a support rib;
a fitting connected to the support rib and having a portion extending above the top outer surface of the moveable control surface component, the fitting comprising a first section and a second section opposite the first section; and
an adjustment screw positioned through the support rib and exposed through the bottom outer surface of the moveable control surface component;
wherein the first section of the fitting comprises a first bearing, the second section of the fitting comprises a threaded connector that is pivotally mounted in a seat of the fitting, the threaded connector engages the adjustment screw, and the fitting is pivotally connected to the support rib to pivot on an axis of the first bearing; and
wherein an angular position of the fitting relative to the support rib is adjusted by way of the adjustment screw, wherein adjustment of the adjustment screw causes the fitting to pivot on the axis of the first bearing.

2. The aircraft of claim 1, wherein the threaded connector is a barrel nut that comprises an internal thread with a longitudinal axis that is perpendicular to a longitudinal axis of the seat in the fitting.

3. The aircraft of claim 1, wherein the fitting comprises a first supporting surface on a side of the fitting that opposes a second supporting surface of a variable end stop, wherein the second supporting surface rests against the first supporting surface.

4. The aircraft control system of claim 1, wherein the support rib comprises a holding element that extends to the fitting, and wherein the fitting is connected with the holding element by way of the first bearing.

5. The aircraft control system of claim 4, wherein the first bearing is arranged outside a profile of the support rib.

6. A system for an aircraft, the system comprising:
a moveable control surface component having a top outer surface, a bottom outer surface, and a support rib;
a fitting comprising a first section and a second section opposite the first section, the fitting extending above the top outer surface of the moveable control surface component, the fitting pivotally connected to the support rib to pivot on an axis of a first bearing in the first section, and the second section comprising a seat formed therein;

an internally threaded connector pivotally held in the seat formed in the second section of the fitting; and an adjustment screw having a first end removably connected to the internally threaded connector, and having a second end exposed through the bottom outer surface of the moveable control surface component, wherein adjusting the adjustment screw causes the fitting to pivot on the axis of the first bearing by displacing the internally threaded connector and the second section of the fitting, relative to the support rib, to change an angular position of the fitting relative to a profile chord of the support rib.

7. An aircraft control system, comprising:

a moveable control surface component comprising a top outer surface, a bottom outer surface, and a support rib;

a fitting connected to the support rib and having a portion extending above the top outer surface of the moveable control surface component, the fitting comprising a first section and a second section opposite the first section;

a first bearing in the first section of the fitting, wherein the fitting is pivotally connected to the support rib to pivot on an axis of the first bearing;

a second bearing in the second section of the fitting, wherein the second bearing comprises a first threaded connector that is pivotally mounted in a seat of the fitting;

a third bearing in the fitting, the third bearing connected to a drive unit for the moveable control surface component; and a second threaded connector positioned through the support rib and exposed through the bottom outer surface of the moveable control surface component, wherein the second threaded connector is removably connected to the first threaded connector to adjustably connect the fitting to the support rib in a variable position, wherein adjustment of the second threaded connector causes the fitting to pivot, relative to the support rib, on the axis of the first bearing.

8. The aircraft control system of claim 7, wherein:

the first threaded connector comprises barrel nut that comprises an internal thread; and the second threaded connector comprises an adjustment screw that threads into the barrel nut.

9. The aircraft control system of claim 7, further comprising a variable end stop having a supporting surface, wherein the second section of the fitting comprises a support surface that opposes the supporting surface of the variable end stop, and wherein the support surface of the second section of the fitting rests against the supporting surface of the variable end stop.

10. The aircraft control system of claim 7, wherein the third bearing comprises a spherical bearing.

11. The aircraft control system of claim 7, wherein the third bearing comprises a pivoting bearing.

* * * * *